United States Patent
Kowaka

(10) Patent No.: US 9,456,094 B2
(45) Date of Patent: Sep. 27, 2016

(54) ELECTRONIC DEVICE AND INFORMATION PROVIDING METHOD THAT PROVIDE ASSISTANCE TO USER'S OPERATION ON HOW TO USE ELECTRONIC EQUIPMENT

(71) Applicant: KYOCERA Document Solutions Inc., Osaka (JP)

(72) Inventor: Makoto Kowaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/815,982

(22) Filed: Aug. 1, 2015

(65) Prior Publication Data
US 2016/0037005 A1    Feb. 4, 2016

(30) Foreign Application Priority Data
Aug. 1, 2014    (JP) .................................. 2014-157962

(51) Int. Cl.
*H04N 1/00*    (2006.01)

(52) U.S. Cl.
CPC ...... *H04N 1/00437* (2013.01); *H04N 1/00419* (2013.01); *H04N 1/00474* (2013.01); *H04N 1/00482* (2013.01); *H04N 1/00503* (2013.01); *H04N 2201/0094* (2013.01)

(58) Field of Classification Search
CPC ..................... H04N 1/00437; H04N 1/00419; H04N 2201/0094; G06F 9/4446

USPC .......... 358/1.13, 1.9; 399/81; 715/705, 707, 715/710, 711
See application file for complete search history.

(56) References Cited

U.S. PATENT DOCUMENTS 5,018,082 A * 5/1991 Obata ................... G06F 9/4446
434/118

FOREIGN PATENT DOCUMENTS

JP    2008-009613 A    1/2008

* cited by examiner

*Primary Examiner* — Jamares Q Washington
(74) *Attorney, Agent, or Firm* — Hawaii Patent Services; Nathaniel K. Fedde; Kenton N. Fedde

(57) ABSTRACT

Provided is an electronic equipment facilitating a search for setting items associated with items to be set. The display management circuit manages to cause the display circuit to display a first setting item connected with various settings and an advanced setting menu associated with the first setting item. The operation receiving circuit receives an operation of the first setting item or the advanced setting menu. The uncertain operation detecting circuit detects an uncertain operation of the first setting item by confirming that no setting is conducted in the advanced setting menu, and a process is returned to the first setting item. The display management circuit manages to cause the display circuit to display the first setting item and a second setting item associated with the first setting item based on a detected result of the uncertain operation of the first setting item.

6 Claims, 10 Drawing Sheets

Figure 1:
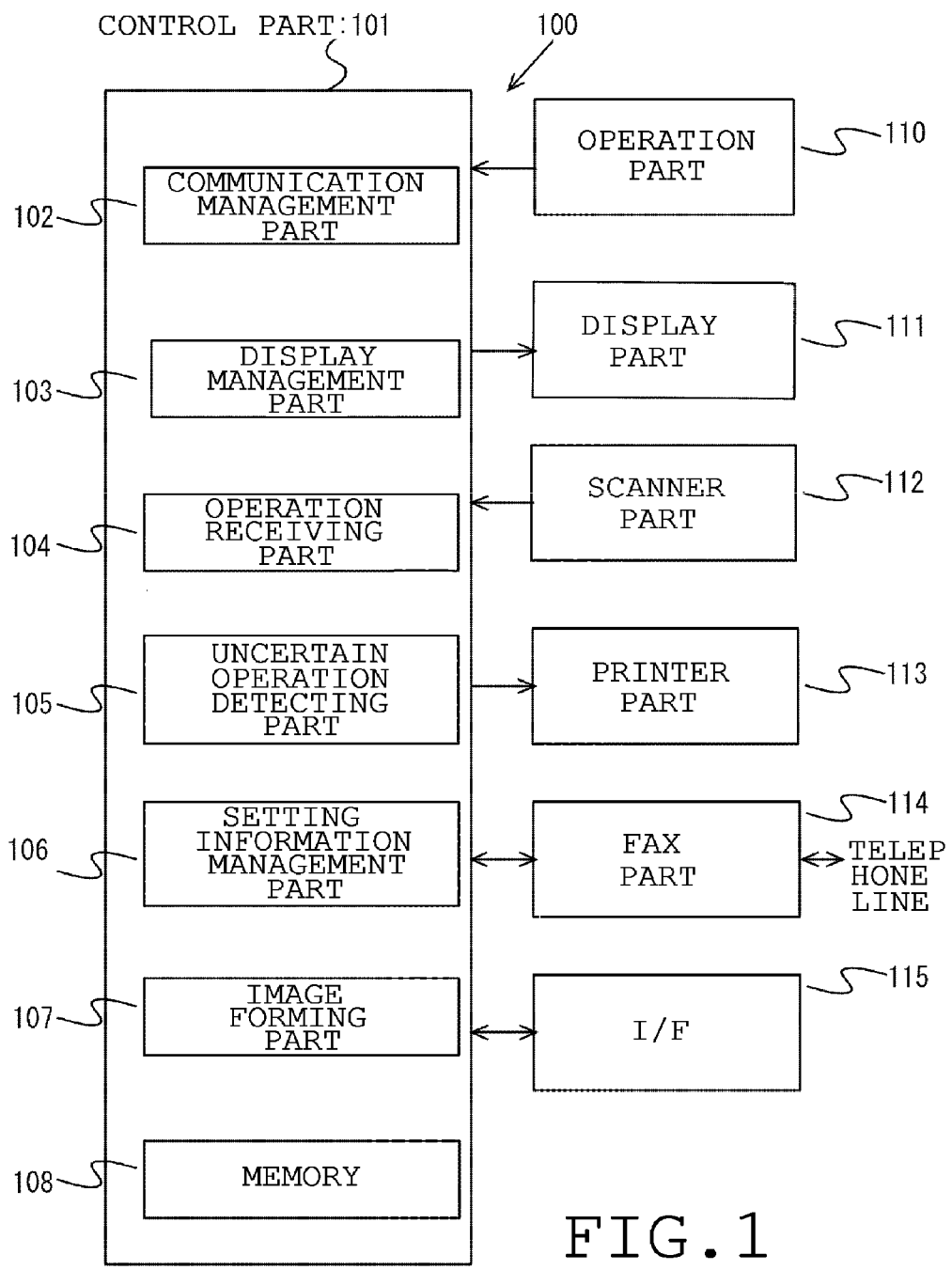

ELECTRONIC DEVICE AND INFORMATION PROVIDING METHOD THAT PROVIDE ASSISTANCE TO USER'S OPERATION ON HOW TO USE ELECTRONIC EQUIPMENT

INCORPORATION BY REFERENCE

This application is based on and claims the benefit of priority from Japanese Patent Application No. 2014-157962 filed on Aug. 1, 2014, the entire contents of which are hereby incorporated by reference.

BACKGROUND

The present disclosure relates to an electronic equipment and an information providing method suitable for providing assistance to a user's operation on how to use the electronic equipment.

For example, an image forming apparatus includes a MFP (Multifunction Peripheral) such as a printer, a multifunction printer, and a multifunction machine. In the image forming apparatus, when a user is unfamiliar with a setting operation of printing a document or the like, it sometimes happens that the user takes much time to do so.

As an apparatus for providing assistance to a user unfamiliar with such an operation, there has been proposed a guidance display apparatus designed to guide an operating procedure. If a divergence calculated from a user operation series to a command execution and a shortest operation series in executing the command is greater than a specific value, the apparatus determines that a user has lost in operation. Then, an execution command corresponding to an uncertain operation series determined to be having a high similarity on the basis of the user operation series and the uncertain operation series is extracted as a predicted command. Then, the apparatus displays guidance information indicating an operation series corresponding to the predicated command.

SUMMARY

An electronic equipment according to an embodiment of the present disclosure comprising: a display circuit; a display management circuit that manages to cause the display circuit to display a first setting item associated with various settings and an advanced setting menu associated with the first setting item; an operation receiving circuit that receives an operation of the first setting item or the advanced setting menu; and an uncertain operation detecting circuit that detects an uncertain operation of the first setting item by confirming that no setting is conducted in the advanced setting menu and a process is returned to the first setting item; wherein the display management circuit manages to cause the display circuit to display the first setting item received by the operation receiving circuit and a second setting item associated with the first setting item based on a detected result of the uncertain operation of the first setting item detected by the uncertain operation detecting circuit.

BRIEF DESCRIPTION OF THE DRAWINGS

FIG. 1 shows an example configuration of an electronic equipment according to the present disclosure;

FIG. 2 shows an example setting screen to be displayed on a display part under the control of a display management part;

FIG. 3A is an explanation drawing for explaining a first lower layer setting menu associated with function setting, a second lower layer setting menu associated with the first lower layer setting menu, and an attribute of the first lower layer setting menu, each being managed by a setting information management part;

FIG. 3B is an explanation drawing for explaining the first lower layer setting menu, the second lower layer setting menu, and the attribute;

FIG. 3C is an explanation drawing for explaining the first lower layer setting menu, the second lower layer setting menu, and the attribute;

FIG. 3D is an explanation drawing for explaining the first lower layer setting menu, the second lower layer setting menu, and the attribute;

FIG. 3E is an explanation drawing for explaining the first lower layer setting menu, the second lower layer setting menu, and the attribute;

FIG. 3F is an explanation drawing for explaining the first lower layer setting menu, the second lower layer setting menu, and the attribute;

FIG. 4 shows an example setting screen displayed on a display part under the control of a display management part in a case where a user's uncertain operation is detected by an uncertain operation detecting part shown in FIG. 1; and FIG. 5 shows steps of display processing executed by an image forming apparatus shown in FIG. 1.

DETAILED DESCRIPTION

Hereinafter, an embodiment of an electronic equipment according to the present disclosure will be described with reference to the accompanying FIG. 1 to FIG. 5. In this context, it should be noted that an electronic equipment to be described later is an image forming apparatus that is a MFP (Multifunction Peripheral), such as a printer, a multifunction printer, and a multifunction machine.

As shown in FIG. 1, an image forming apparatus 100 includes a control part 101, an operation part 110, a display part 111, a scanner part 112, a printer part 113, a FAX part 114, and an I/F (interface) 115. The control part 101 is a circuit that controls the whole operation of the image forming apparatus 100 based on programs stored in a ROM. The control part 101 includes a communication management part 102, a display management part 103, an operation receiving part 104, an uncertain operation detecting part 105, a setting information management part 106, an image forming part 107, and a memory 108.

The communication management part 102 is a circuit that receives a print job or the like containing a print request and print data from a client terminal via the I/F 115. The display management part 103 manages to cause the display part 111 to display the contents associated with settings of a copy, a printer, a scanner, and a FAX. The details thereof will follow later. The operation receiving part 104 receives a setting operation of the copy, the printer, the scanner, and the FAX or the like by the operation part 110.

The uncertain operation detecting part 105 is a circuit that detects a user's uncertain operation in various setting menus displayed on the display part 111. The uncertain operation detecting part 105 confirms, for example, that a user performs as it is a setting operation returning to an original item without setting a next setting item, though the user moves from an optional setting item to the next setting item associated with the optional setting item. Thereby, the uncertain operation detecting part 105 detects an uncertain operation. In this context, the return operation means that a back button 240 to be described later is operated. The setting information management part 106 is a circuit manages, for example, a first lower layer setting menu, a second lower layer setting menu associated with the first lower layer setting menu, and an attribute of the first lower layer setting menu. They are connected with function setting, and the details thereof will follow later.

The image forming part 107 is a circuit that applies, for example, image processing to print data from a client terminal. The image processing is rasterization, for example. The memory 108 stores print data or the like from the client terminal. The memory 108 stores the print data from the client terminal. Further, the memory 108 also stores the contents connected with settings of the copy, the printer, the scanner, and the FAX to be described later.

The operation part 110 is a circuit that includes a touch panel, for example. The operation part 10 receives, for example, a touch operation in performing an operation connected with the settings of the copy, the printer, the scanner, and the FAX or the like to be described later.

The display part 111 is a circuit that displays the contents or the like connected with the settings of the copy, the printer, the scanner, and the FAX to be described later. Further, the display part 111 also displays a file setting of print data to be printed, a message to guide a login, and a file list of the print data a user can print.

The scanner part 112 is a circuit that inputs image data of a document read by an image sensor to the control part 101. In other words, the scanner part 112 converts an image signal of the document from the image sensor into digital image data, and sequentially inputs the image data to the control part 101.

The printer part 113 is a circuit that prints an image on a paper based on the image data output from the control part 101. In other words, the printer part 113 forms an electrostatic latent image on a photosensitive drum by a modulated laser beam based on the image data. In this connection, the image data is rasterized by and output from the control part 101. Then, a toner image is formed from the electrostatic latent image developed by supply of toner, and is transferred on a paper.

The FAX part 114 is a circuit that transmits the image data output from the control part 101 to a destination facsimile through a telephone line. The FAX part 114 receives the image data from the destination facsimile and inputs the image data to the control part 101. In other words, the FAX part 114 controls connection with the telephone line via a NCU (Network Control Unit). Then, the FAX part 114 compresses, modulates the image data output from the control part 101, and transmits the image data to the destination facsimile.

Further, the FAX part 114 demodulates and decompresses the image data from the destination facsimile, and inputs the image data to the control part 101 while maintaining the connection with the telephone line via the NCU. The I/F 115 is connected to a network. The I/F 115 allows data transmission and reception among the client terminal, a data management server, and a portable terminal or the like.

In this connection, for a job of executing a copy function, image data is input from the scanner part 112 to the memory 108. Then, the image data is output from the memory 108 to the printer part 113. For a job of executing a print, image data rasterized by the image forming apparatus 107 is output to the printer part 113. For a job of executing a scanner function, image data is input from the scanner part 112 to the memory 108. Then, the image data is output from the memory 108 to the I/F 115.

For a job of executing a facsimile transmitting function, image data is input from the scanner part 112 (or I/F 115) to the memory 108. Then, the image data is output from the memory 108 to the FAX part 114. For a job of executing a facsimile receiving function, image data is input from the FAX part 114 to the memory 108. Then, the image data is output from the memory 108 to the printer part 113.

Figure 2:
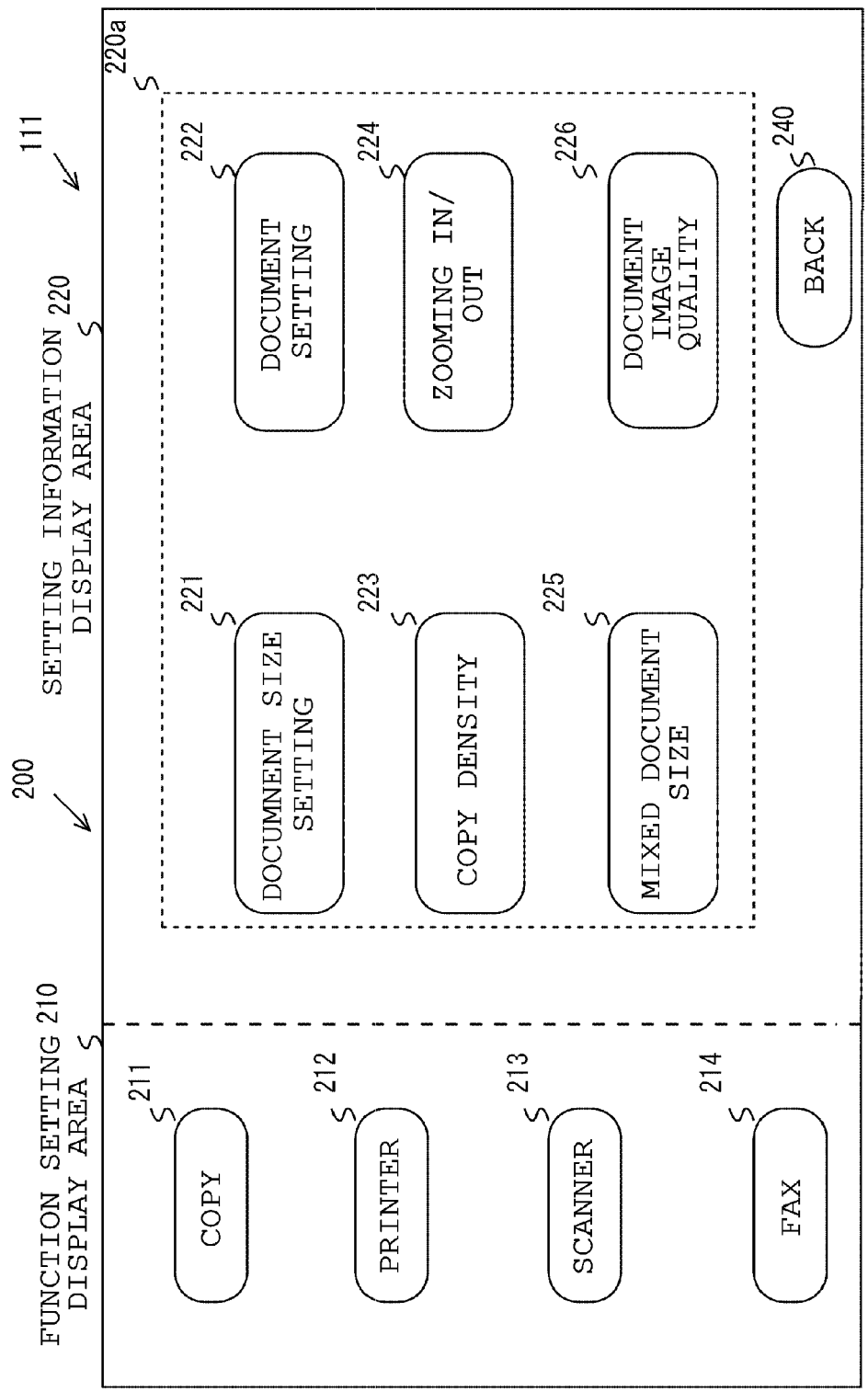

A description will next be made to a setting screen to be displayed on the display part 111 under the control of the display management part 103 with reference to FIG. 2. FIG. 2 shows an outline in a case where a setting menu connected with a copy setting is displayed. Namely, for example, a function setting display area 210 and a setting information display area 220 are provided in a setting screen 200 displayed on the display part 111. In this connection, portions surrounded by a dotted line indicate a setting menu display area 220a. For example, a copy setting item 211, a printer setting item 212, a scanner setting item 213, and a FAX setting item 214 or the like are displayed in the function setting display area 210. It is to be noted in FIG. 2 that the copy setting item 211, the printer setting item 212, the scanner setting item 213, and the FAX setting item 214 are expressed simply as a copy 211, a printer 212, a scanner 213, and a FAX 214, respectively, for convenience of explanation. Nonetheless, each pair indicates the same thing and this holds true even in the following description.

For example, a document size setting item 221, a paper setting item 222, a copy density setting item 223, a zooming in/out setting item 224, a mixed document size setting item 225, a document image quality setting item 226, and a back button 240 are displayed in the setting menu display area 220a of the setting information display area 220. Among these, the document size setting item 221, the paper setting item 222, the copy density setting item 223, the zooming in/out setting item 224, the mixed document size setting item 225, and the document image quality setting item 226 are a first lower layer setting menu associated with the copy setting item 211. In other words, operating the copy setting item 211 displays these first lower layer setting menus on the setting menu display area 220a. Further, operating each item of the these first lower layer setting menus displays a second lower layer setting menu to be described later on the setting menu display area 220a. It is to be noted in FIG. 2 that the document size setting item 221, the paper setting item 222, the copy density setting item 223, zooming in/out setting item 224, the mixed document size setting item 225, the document image quality setting item 226 are expressed simply as a document size setting 221, a paper setting 222, a copy density 222, a zooming in/out 224, a mixed document size 225, and a document image quality 226, respectively, for convenience of explanation. Nonetheless, each pair indicates the same thing and this holds true even in the following description.

Herein, the document size setting item 221 is operated in setting a size of a document to be read by the scanner part 112. The paper setting item 222 is operated in setting a paper on which image data read by the scanner part 112 is printed by the printer part 113. The copy density setting item 223 is operated in setting density of a document to be read by the scanner part 112.

The zooming in/out setting item 224 is operated in setting a magnification ratio or a reduction ratio of a document to be read by the scanner part 112. The mixed document size setting item 225 is operated in setting reading of a document having a different size at one time by the scanner part 112. The document image quality setting item 226 is operated in setting an image quality of a document to be read by the scanner part 112. The back button 240 is operated in returning from a current display state to a former display state.

A description will next be made to an outline of setting information managed by the setting information management part 106. In this connection, FIG. 3 shows what is related to the copy setting item 211. The setting information managed by the setting information management part 106 is stored in the above-mentioned memory 108. Further, the setting information managed by the setting information management part 106 serves, for example, as a first lower layer setting menu associated with function setting, a second lower layer setting menu associated with the first lower layer setting menu, and an attribute of the first lower layer setting menu. The attribute is connected with the first lower layer setting menu.

Figure 3A:
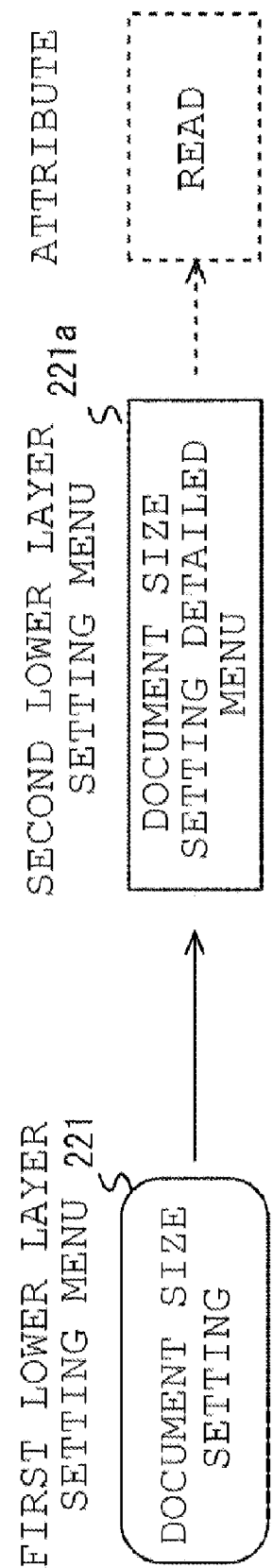
Figure 3B:
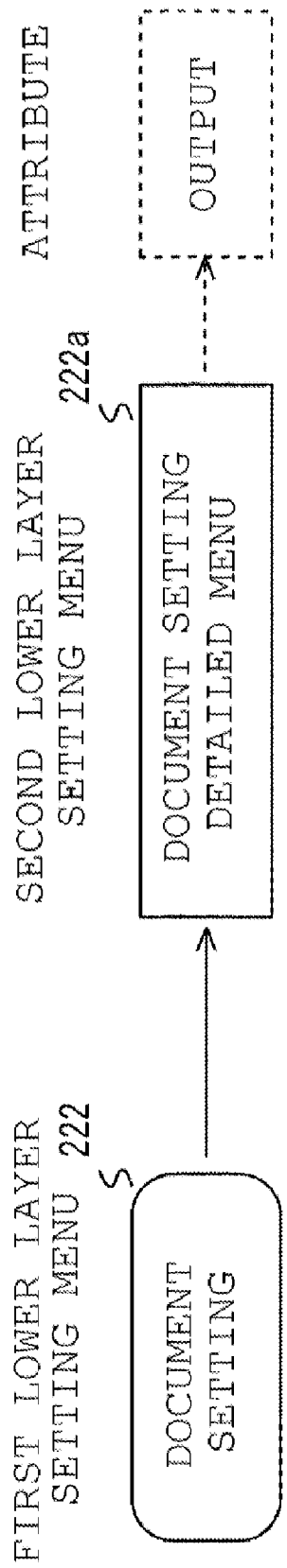

FIG. 3A shows a case where the document size setting advanced menu 221a that is the second lower layer setting menu is connected with the document size setting item 221 that is the first lower layer setting menu. The document size setting advanced menu 221a is displayed on the display part 111 under the control of the display management part 103 when the document size management setting item 221 is operated. As mentioned above, the document size setting item 221 is operated in setting a size of a document to be read by the scanner part 112. An attribute connected with the document size setting item 221 of the first lower layer setting menu is set to "read".

FIG. 3 shows a case where the paper setting advanced menu 222a that is the second lower layer setting menu is connected with the paper setting item 222 that is the first lower layer menu. The document setting advanced menu 222a is displayed on the display part 111 under the control of the display management part 103 when the paper setting item 222 is operated. As mentioned above, the paper setting item 222 is operated in setting a paper on which image data read by the scanner part 112 is printed by the printer part 113. An attribute connected with the document setting item 221 of the first lower layer setting menu is set to "output".

Figure 3C:
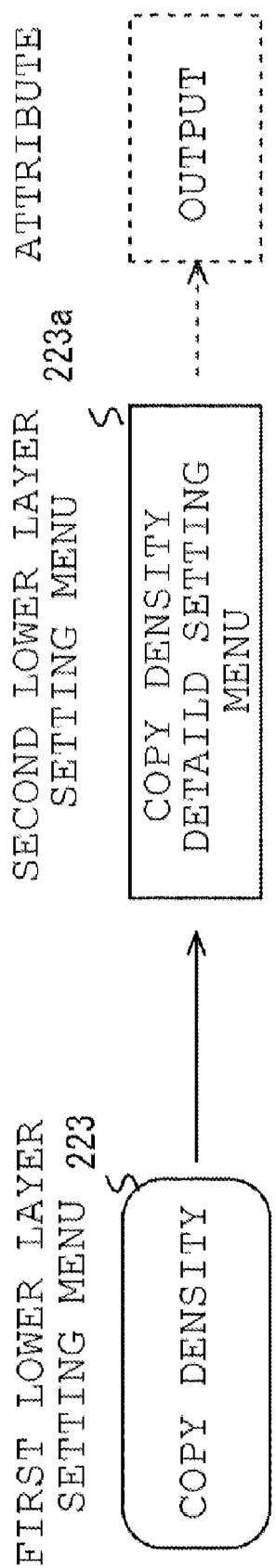

FIG. 3C shows a case where the copy density advanced setting menu 223a that is the second lower layer setting menu is connected with the copy density setting item 223 that is the first lower layer setting menu. The copy density advanced setting menu 223a is displayed on the display part 111 under the control of the display management part 103 when the copy density setting item 223 is operated. As mentioned above, the copy density setting item 223 is operated in setting density of a document to be read by the scanner part 112. An attributed connected with the copy density setting item 223 of the first lower layer setting menu is set to "output".

Figure 3D:
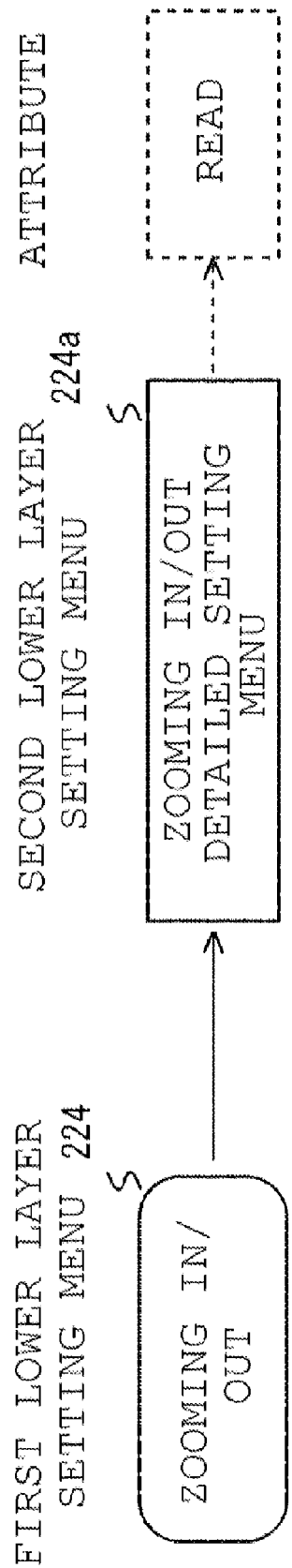

FIG. 3D shows a case where the zooming in/out advanced setting menu 224a that is the second lower layer setting menu is connected with the zooming in/out setting item 224 that is the first lower layer setting menu. The zooming in/out advanced setting menu 224a is displayed on the display part 111 under the control of the display management part 103 when the zooming in/out setting item 224 is operated. As mentioned above, the zooming in/out setting item 224 is operated in setting a magnification ratio or a reduction ratio of a document to be read by the scanner part 112. An attributed connected with the zooming in/out setting item 224 of the first lower layer setting menu is set to "read".

Figure 3E:
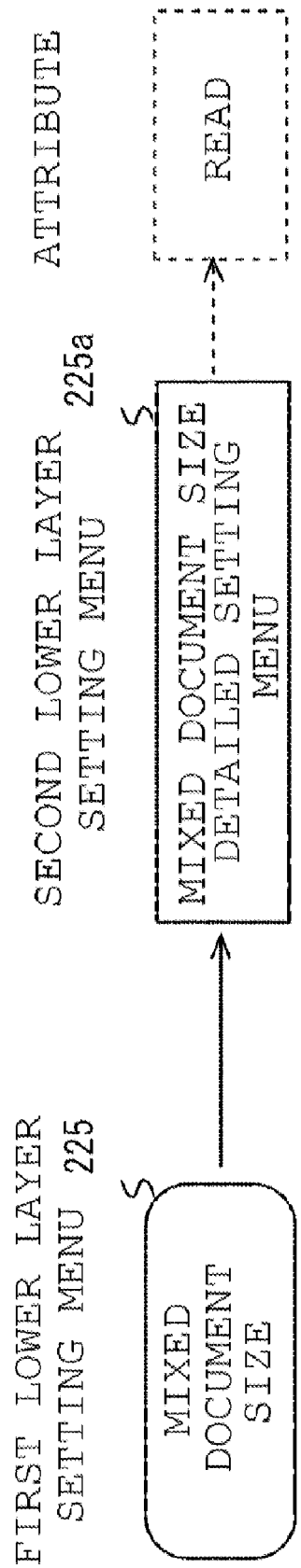

FIG. 3E shows a case where the mixed document size advanced setting menu 225a that is the second lower layer setting menu is connected with the mixed document size setting item 225 that is the first lower layer setting menu. The mixed document size advanced setting menu 225a is displayed on the display part 111 under the control of the display management part 103 when the mixed document size setting item 225 is operated. As mentioned above, the mixed document size setting item 225 is operated in setting reading of a document having a different size at one time by the scanner part 112. An attribute connected with the mixed document size setting item 225 of the first lower layer setting menu is set to "read".

Figure 3F:
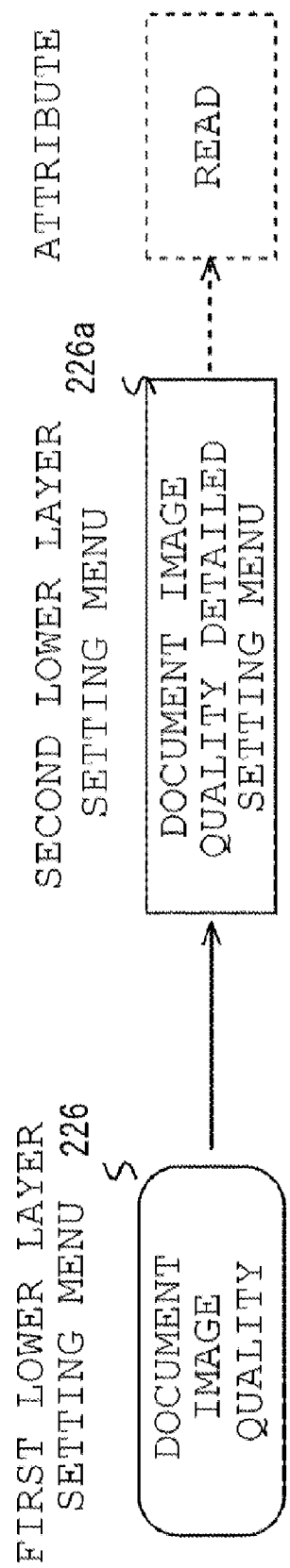

FIG. 3F shows a case where the document image quality advanced setting menu 226a that is the second lower layer setting menu is connected with the document image quality setting item 226 that is the first lower layer setting menu. The document image quality advanced setting menu 226a is displayed on the display part 111 under the control of the display management part 103 when the document image quality setting item 226 is operated. As mentioned above, the document image quality setting item 226 is operated in setting an image quality of a document to be read by the scanner part 112. An attribute connected with the document image quality setting item 226 is set to "read".

In this connection, in FIG. 3A to FIG. 3F, only the first lower layer setting menu and the second lower layer setting menu are shown as a setting menu associated with the copy setting item 211. However, in some cases, there exists a third lower layer setting menu or the like associated with the second lower layer setting menu, but illustration and description thereof are omitted for brevity's sake.

In FIG. 3, an outline of a setting menu associated with the copy setting item 211 and an attribute associated with the first lower layer setting menu is shown. A setting menu and an attribute associated with the printer setting item 212, the scanner setting item 213, and the FAX setting item 214 are also managed by the setting information management part 106 in the same way as the above.

Figure 4:
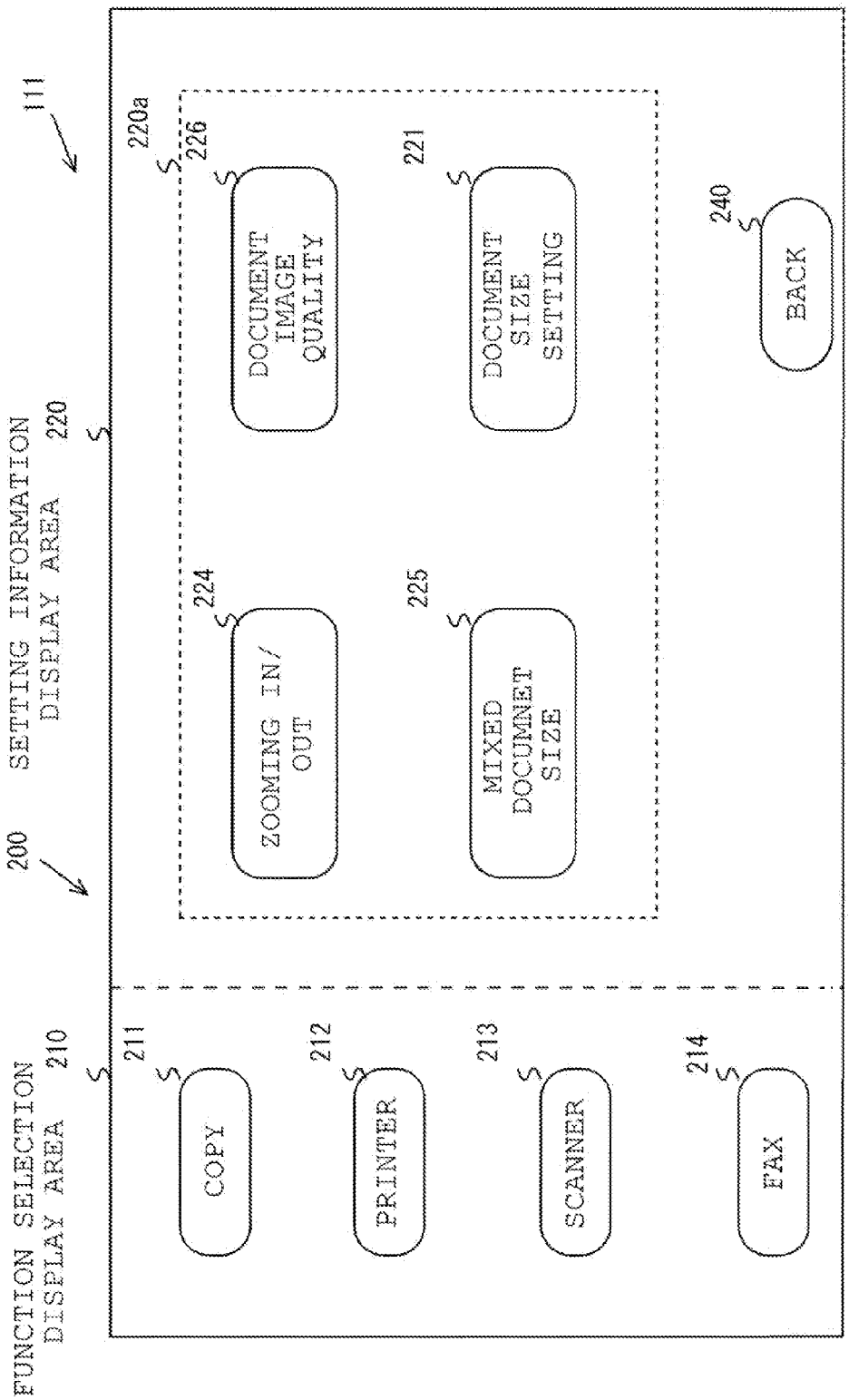

A description will be made to a display example of a setting screen on the display part 111 under the control of the display management part 103 when a user's uncertain operation is detected by the uncertain operation detecting part 105. In this connection, FIG. 4 is a display example showing a situation as follows. For example, in FIG. 4, the document size setting advanced menu 221a is displayed on the display part 111 by operating the document size setting item 221. However, FIG. 4 shows a case where no setting is conducted in the document size setting advanced menu 221a, and then a process is returned to the setting screen shown in FIG. 2, for example.

First, as shown in FIG. 4, the zooming in/out setting item 224, the document image quality setting item 226, the mixed document size setting item 225, and the document size setting item 221 are displayed in the setting menu display area 220a of the setting information display area 220. Herein, as shown in FIG. 3, an attribute connected with settings of these items is each set to "read". In other words, the document size setting advanced menu 221a is displayed on the display part 111 by operating the document size setting item 221 whose attribute connected with the settings is set to "read". However, there are times when no setting is conducted in the document size setting advanced menu 221a, and the back button 240 is operated, for example. In this case, a process returns to the setting screen shown in FIG. 2, for example. Thereby, a user's uncertain operation is detected by the uncertain operation detecting part 105. As a result, the another zooming in/out setting item 224, the document image quality setting item 226, and the mixed document size setting item 225, each attribute being set to "read", are simultaneously displayed, in addition to the document size setting item 221.

However, the another zooming in/out setting item 224, the document image quality setting item 226, and the mixed document size setting item 225 are displayed at a position easy to more attract a person's attention than the document size setting item 221. This is due to a high possibility that a user tends to set items other than the document size setting item 221. Herein, the position easy to more attract a person's attention is a position defined in consideration of human characteristics. In other words, the position is defined on the basis of human's behavior that when plural items are vertically arranged side by side, a human is prone to see the items "from left to right" and "from top to bottom".

Alternatively, the another zooming in/out setting item 224, the document image quality setting item 226, and the mixed document size setting item 225 may be displayed in lighting or be displayed in color. This contributes to separately display the items from the document size setting item 221 in which an uncertain user's operation is occurred.

FIG. 4 shows an uncertain user's operation in the document size setting item 221. However, the same thing holds true as above even for the document setting item 222, the copy density setting item 223, the zooming in/out setting item 224, the mixed document size setting item 225, and the document image quality setting item 226. In other words, items having the same attribute are displayed, which are connected with settings in which an uncertain user's operation is detected.

Figure 5:
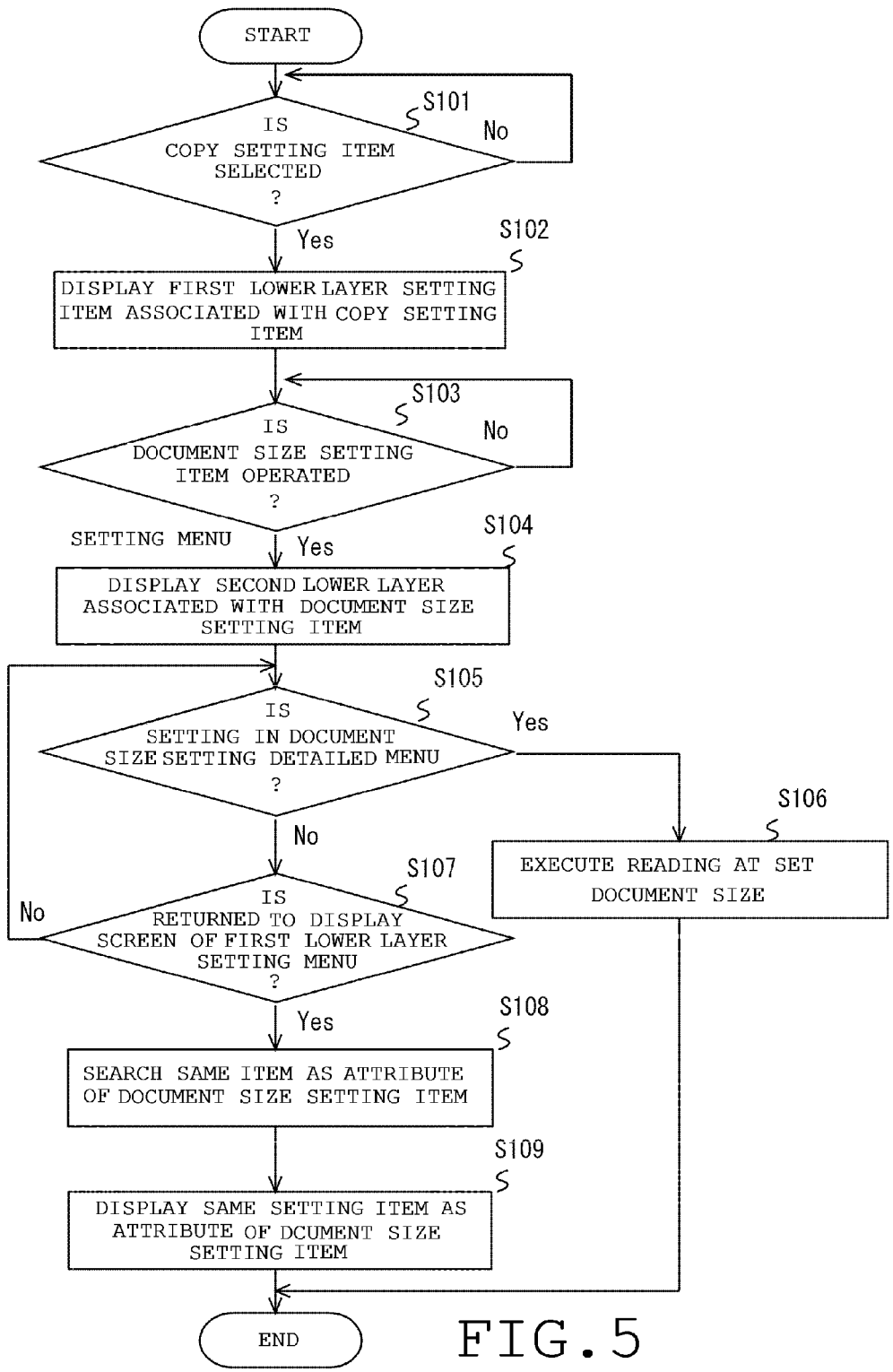

A description will be made to display processing by the image forming apparatus 100 with reference to FIG. 5. The description will be made by taking the following case as an example. First, the first lower layer setting menu is displayed by an operation of the copy setting item 211. Thereby, the document size setting item 221 of the first lower layer setting menu is operated to display the document size setting advanced menu 221*a* of the second lower layer setting menu. However, no setting is conducted in the document size setting advanced menu 221*a* and a process returns to the setting screen 200 shown in FIG. 2.

(Step S101)

First, the control part 101 determines whether a selective operation of the copy setting item 211 is received or not by the operation receiving part 104. If the copy setting item 211 is not selected (step S101: No), a process is placed in a wait state until the copy setting item 211 is selected. Otherwise, if the copy setting item 211 is selected (step S101: Yes), a process proceeds to step S102.

(Step S102)

The display management part 103 manages to cause the display part 111 to display the first lower layer setting menu shown in FIG. 2 in the setting menu display area 220*a* of the setting information display area 220. As mentioned above, the first lower layer setting menu is connected with the copy setting item 211. The first lower layer setting menu contains the document size setting item 221, the paper setting item 222, the copy density setting item 223, the zooming in/out setting item 224, the mixed document size setting item 225, and the document image quality setting item 226.

(Step S103)

The control part 101 determines whether an operation of the document size setting item 221 of the first lower layer setting menu is received or not by the operation receiving part 104. If the operation of the document size setting item 221 is not received (step S103: No), a process is placed in a wait state until the operation of the document size setting item 221 is received. Otherwise, if an operation of the document size setting item 221 is received (step S103: Yes), a process proceeds to step S104.

(Step S104)

The display management part 103 manages to cause the display part 111 to display the second lower layer setting menu shown in FIG. 3 in the setting menu display area 220*a* of the setting information display area 220. As mentioned above, the second lower layer setting menu is connected with the first lower layer setting menu. The second lower layer menu contains the document size setting advanced menu 221*a*, the paper setting advanced menu 222*a*, the copy density advanced setting menu 223*a*, the zooming in/out advanced setting menu 224*a*, the mixed document size advanced setting menu 225*a*, and the document image quality advanced setting menu 226*a*.

(Step S105)

The control part 101 determines whether a setting is conducted or not in the document size setting advanced menu 221*a*. If the setting is conducted in the document size setting advanced menu 221*a* (step S105: Yes), a process proceeds to step S106. Otherwise, if no setting is conducted in the document size setting advanced menu 221*a* (step S105: No), a process proceeds to step S107.

(Step S106)

The control part 101 controls to cause the scanner part 112 to read a document based on the settings in the document size setting advanced menu 221*a*.

(Step S107)

The uncertain operation detecting part 105 determines whether a process is returned or not from a setting screen on which the document size setting advanced menu 221*a* is displayed to a setting screen on which the first lower layer setting menu shown in FIG. 2 is displayed. If the process is not yet returned to the setting screen on which the first lower layer setting menu is displayed, a process proceeds to step S105. Otherwise, if a process is already retuned to the setting screen on which the first lower layer setting menu is displayed, a user's uncertain operation is detected by the uncertain detecting part 105 and a process proceeds to step S108.

(Step S108)

The setting information management part 106 searches a setting item having the same attribute as that of the document size setting item 221 of the first lower layer setting menu based on a detected result by the uncertain operation detecting part 105. in this case, since an attribute of the document size setting item 221 is set to "read", a search is made to the zooming in/out setting item 224, the document image quality setting item 226, the mixed document size setting item 225, each having the same attribute. Then, a process proceeds to step S109.

(Step S109)

The display management part 103 manages to cause the display part 111 to display the document size setting item 221 whose attribute searched by the setting information management part 106 is set to "read". Additionally, the display management part 103 also manages to cause the display part 111 to simultaneously display the another zooming in/out setting item 224, the document image quality setting item 226, the mixed document size setting item 225. In this case, as mentioned above, the another zooming in/out setting item 224, the document image quality setting item 226, the mixed document size setting item 225 are displayed at a position easy to more attract a person's attention than the document size setting item 221.

Thus, in the present embodiment, the display management part 103 manages to cause the display part 111 to display the first setting item (first lower layer setting menu) associated with various settings and the advanced setting menu (second lower layer setting menu) associated with the first setting item (first lower layer setting menu). The operation receiving part 104 receives an operation of the first setting item (first lower layer setting menu) or the advanced setting menu (second lower layer setting menu). The uncertain operation detecting part 105 detects an uncertain operation of the first setting item (first lower layer setting menu) by confirming that no setting is conducted in the advanced setting menu (second lower layer setting menu), and a process is returned to the first setting item (first lower layer setting menu). Then, the display management part 103 manages to cause the display part 111 to display the first setting item (first lower layer setting menu) received by the operation receiving part 104 and the second setting item (first lower layer setting menu) associated with the first setting item (first lower layer setting menu) on the basis of a detected result of an uncertain operation of the first setting menu (first lower layer setting menu) by the uncertain operation detecting part 105. This facilitates a search for the setting items associated with items to be set. Accordingly, the present embodiment enables a problem of taking much time for setting to be successfully solved.

Further, the setting information management part 106 manages the first lower layer setting menu associated with function setting that is the first setting item or the second setting item, the second lower layer setting menu that is the advanced setting menu, and an attribute of the first lower layer setting menu. The setting information management part 106 searches the another first lower layer setting menu having the same attribute as that of the first lower layer setting menu received by the operation receiving part 104 on the basis of a detected result by the uncertain operation detecting part 105. The display management part 103 manages to cause the display part 111 to display the first lower layer setting menu received by the operation receiving part 104 and the another first lower layer setting menu having the same attribute as that of the first lower layer setting menu.

Moreover, in the present embodiment, the display management part 103 manages to cause the display part 111 to display the second setting item (first lower layer setting menu) associated with the first setting item (first lower layer setting menu) at a top side or at a left side with respect to the first setting item. Accordingly, as mentioned above, the setting items associated with items to be set can be arranged at a position easy to more attract a person's attention.

To be more specific, the guidance display apparatus in the above-mentioned typical case can provide guidance for an operation procedure to a command execution, based on a user's situation. For this reason, the guidance display apparatus enables even a user unfamiliar with a setting operation to be operated while confirming guidance information.

Nevertheless, the guidance information by such guidance display apparatus is provided only for items to be set. On the contrary, guidance information associated with the items to be set is not displayed. For this reason, there remains as yet a problem that a user who searches the setting items associated with the items to be set takes much time for setting.

In contrast, according to the electronic equipment and the information providing method of the present disclosure, they facilitate a search for the setting items associated with the items to be set. Accordingly, they allow the problem of taking much time for setting to be successfully solved.

While in the present embodiment, the descriptions are made by giving an example where the electronic equipment of the present disclosure is applied to the image forming apparatus 100, not necessarily limited thereto, it goes without saying that the present disclosure may also be applied to other electronic equipments having various setting items, such as a car navigation system, a PC (Personal Computer), and a portable terminal.

What is claimed is:

1. An electronic equipment comprising:
 a display circuit;
 a setting information management part that manages:
  a first lower layer setting menu including a plurality of setting items each having an attribute, wherein:
   the plurality of setting items are associated with settings of the electronic equipment;
   the plurality of setting items comprise a first setting item having an attribute and a second setting item having an attribute that is the same as the attribute of the first setting item; and
   less than all of the plurality of setting items have the attribute that is the same as the attribute of the first setting item;
  a second lower layer setting menu that is an advanced setting menu associated with the first setting item; and
  the attributes of the plurality of setting items;
 a display management circuit that manages to cause the display circuit to display:
  the first lower layer setting menu; and
  the advanced setting menu following an operation of the first setting item;
 an operation receiving circuit that can receive:
  the operation of the first setting item to display the advanced setting menu;
  an operation of the advanced setting menu to conduct a setting in the advanced setting menu; and
  an operation of a process for returning from the advanced setting menu; and
 an uncertain operation detecting circuit that detects an uncertain operation of the first setting item by confirming that, following the display of the advanced setting menu, the setting is not conducted in the advanced setting menu and the operation of a process for returning from the advanced setting menu is received; wherein
 based on the detection of an uncertain operation of the first setting item,
  the setting information management part searches the plurality of setting items for setting items having the same attribute as the attribute of the first setting, and
  the display management circuit manages to cause the display part to display the first setting item and the second setting item having the attribute that is the same as the attribute of the first setting item.

2. The electronic equipment according to claim 1, wherein the display management circuit manages to cause the display circuit to display the second setting item at an upper side or at a left side with respect to the first setting item.

3. An information providing method executed by a computer for control of an electronic equipment that provides various setting information through a display circuit, the method comprising:
 managing:
  a first lower layer setting menu including a plurality of setting items each having an attribute, wherein:
   the plurality of setting items are associated with settings of the electronic equipment;
   the plurality of setting items comprise a first setting item having an attribute and a second setting item having an attribute that is the same as the attribute of the first setting item; and
    less than all of the plurality of setting items have the attribute that is the same as the attribute of the first setting item;
  a second lower layer setting menu that is an advanced setting menu associated with the first setting item; and
  the attributes of the plurality of setting items;
causing, by a display management circuit, the display circuit to display:
  the first lower layer setting menu; and
  the advanced setting menu following an operation of the first setting item;
receiving, by an operation receiving circuit,
  the operation of the first setting item, thereby causing the display circuit to display the advanced setting menu, and
  an operation of the advanced setting menu to conduct a setting in the advanced setting menu, or an operation of a process for returning from the advanced setting menu;
detecting, by an uncertain operation detecting circuit, an uncertain operation of the first setting item by confirming that, following the display of the advanced setting menu, the setting is not conducted in the advanced setting menu and the operation of a process for returning from the advanced setting menu is received;
based on the detection of an uncertain operation of the first setting item:
  searching the plurality of setting items for setting items having the same attribute as the attribute of the first setting, thereby finding the second setting item, and
  causing, by the display management circuit, the display circuit to display the first setting item and the second setting item having the attribute that is the same as the attribute of the first setting item based.

4. The information providing method according to claim 3, further comprising causing, by the display management circuit, the display circuit to display the second setting item at an upper side or at a left side with respect to the first setting item.

5. The information providing method according to claim 3, wherein the step of causing the display circuit to display the first setting item and the second setting item having the attribute that is the same as the attribute of the first setting item, based on the detection of an uncertain operation of the first setting item, comprises:
  causing the display circuit to display the first setting item and the second setting item and not display the setting items of the plurality of setting items of the first lower layer setting menu that do not have the attribute that is the same as the attribute of the first setting item.

6. The electronic equipment according to claim 1 wherein the display, based on the detection of an uncertain operation of the first setting item, of the first setting item and the second setting item having the attribute that is the same as the attribute of the first setting item comprises:
  display of the first setting item and the second setting item and not display of the setting items of the plurality of setting items of the first lower layer setting menu that do not have the attribute that is the same as the attribute of the first setting item.

* * * * *